(12) United States Patent
Vlazny et al.

(10) Patent No.: US 7,883,411 B2
(45) Date of Patent: Feb. 8, 2011

(54) METHODS AND SYSTEMS FOR CONDUCTING PARIMUTUEL WAGERS

(75) Inventors: Kenneth A. Vlazny, York, PA (US); Joseph J. Tracy, Westminster, MD (US); Victor I. Harrison, Glen Rock, PA (US); Jeffery B. Murphy, Glen Rock, PA (US); Stephen M. Smith, Shrewsbury, PA (US)

(73) Assignee: United Tote Company, Glen Rock, PA (US)

( * ) Notice: Subject to any disclaimer, the term of this patent is extended or adjusted under 35 U.S.C. 154(b) by 1498 days.

(21) Appl. No.: 10/704,533

(22) Filed: Nov. 7, 2003

(65) Prior Publication Data

US 2005/0102223 A1    May 12, 2005

(51) Int. Cl.
*A63F 9/24*  (2006.01)
*A63F 13/00* (2006.01)
*G06F 17/00* (2006.01)
*G06F 19/00* (2006.01)

(52) U.S. Cl. .............................. 463/28; 463/6; 463/25; 463/26; 463/27; 463/42

(58) Field of Classification Search ............... 463/6, 463/25–28, 42
See application file for complete search history.

(56) References Cited

U.S. PATENT DOCUMENTS

| | | | |
|---|---|---|---|
| 5,275,400 A * | 1/1994 | Weingardt et al. | 463/12 |
| 5,779,547 A | 7/1998 | SoRelle et al. | |
| 5,888,136 A | 3/1999 | Herbert | |
| 6,152,822 A | 11/2000 | Herbert | |
| 6,210,275 B1 * | 4/2001 | Olsen | 463/16 |
| 6,309,307 B1 | 10/2001 | Krause et al. | |
| 6,331,148 B1 | 12/2001 | Krause et al. | |
| 7,172,508 B2 * | 2/2007 | Simon et al. | 463/42 |
| 2002/0065120 A1 | 5/2002 | Lee | |

(Continued)

FOREIGN PATENT DOCUMENTS

WO        WO 98/40139        9/1998

(Continued)

OTHER PUBLICATIONS

International Search Report, Mar. 22, 2005, 3 pages.

(Continued)

*Primary Examiner*—Dmitry Suhol
*Assistant Examiner*—Jason Pinheiro
(74) *Attorney, Agent, or Firm*—TraskBritt (57) ABSTRACT

The present invention contemplates methods and systems of conducting wagers, such as parimutuel wagers. In one exemplary embodiment an event, such as a horse race, dog race, a combination of races, etc., is identified for which a plurality of bettors may each place at least one wager. Each bettor of the plurality is enabled to provide input regarding at least one portion of their respective at least one wager prior to the event. At least one other portion of each bettor's at least one wager is randomized prior to the event. The wager then comprises the combination of the bettor-selected portion and randomized portion. In one exemplary embodiment, the player-selected portion may include selecting bettor-preferred participants of the event while the randomly selected portion may include randomly assigning a finishing order to the player-selected participants.

38 Claims, 3 Drawing Sheets

U.S. PATENT DOCUMENTS

2002/0155885 A1* 10/2002 Shvili .......................... 463/25
2003/0199315 A1   10/2003 Downes
2004/0229671 A1* 11/2004 Stronach et al. ................ 463/6
2004/0235542 A1* 11/2004 Stronach et al. ................ 463/6

FOREIGN PATENT DOCUMENTS

WO      WO 00/25876      5/2000

OTHER PUBLICATIONS

Web page http://lotteryinsider.com/news/thurs.htm, visited Oct. 7, 2004 (1 page).

Swedish webpage and accompanying translation, http:/www.atg.se/grunderna/spelskola.jsp?sida=2, visited Dec. 10, 2003 (5 pages).

Swedish webpage and accompanying translation, http://www.atgkampanj.nu/hb/html/html, visited Dec. 10, 2003 (2 pages).

Swedish webpage and accompanying translation, http://www.atg.se/grunderna/attspelapahastar.jsp?sida=interbet, visited Dec. 15, 2003 (3 pages).

Swedish webpage and accompanying translation, http://www.atg.se/grundera/attspelapahastar.jsp?sida=harryboy, visited Nov. 24, 2003 (4 pages).

* cited by examiner

| Race | 1 | 2 | 3 | 4 | 5 | 6 | 7 | 8 | 9 | 10 | 11 | 12 |
|---|---|---|---|---|---|---|---|---|---|---|---|---|
| 1. Churchill Downs #6 | | | | | | | | | | | | |
| 2. Arlington Park #4 | | | | | | | | | | | | |
| 3. Calder Racecourse #5 | | | | | | | | | | | | |
| 4. Philadelphia Park #3 | | | | | | | | | | | | |
| 5. Beulah Park #2 | | | | | | | | | | | | |
| 6. Tampa Bay Downs #4 | | | | | | | | | | | | |
| 7. Gulfstream #6 | | | | | | | | | | | | |

FIG. 1

| Tier | Number of Correct Matches | Odds | Number of Winners | Price | % of Pool | Liability |
|---|---|---|---|---|---|---|
| 1 | 7 of 7 | 1,744.998 | 1 | 444,974.56 | 15.0 | 444,974.56 |
| 2 | 6 of 7 | 30,401 | 57 | 5,168.11 | 10.0 | 296,650 |
| 3 | 5 of 7 | 1,236 | 1,412 | 420.17 | 20.0 | 593,299 |
| 4 | 4 of 7 | 90 | 19,298 | 46.12 | 30.0 | 889,949 |
| 5 | 3 of 7 | 11 | 158,243 | 4.69 | 25.0 | 741,624 |
|  | TOTAL |  | 179,011 |  | 100.0 | 2,966,497 |

METHODS AND SYSTEMS FOR CONDUCTING PARIMUTUEL WAGERS

BACKGROUND OF THE INVENTION

1. Field of the Invention

The present invention generally relates to parimutuel wagering and, more particularly, to methods of conducting such wagering activities including, for example, methods and systems for accepting and pricing parimutuel wagers.

2. State of the Art

Parimutuel wagering essentially includes the placing of wagers by a plurality of individuals on the outcome of an event, wherein the bettors who place "winning" wagers share the betting pool minus a percentage taken out for the management or administration of the wagering activity. For example, parimutuel wagering is often associated with racing (e.g., horses or dogs) wherein individuals may place wagers on one or more aspects of the outcome of the race. These aspects may include, for example, which of the participants (also referred to herein as runners) will win the race, the order in which a plurality of runners will finish the race (e.g., perfecta—ordered prediction of first and second place; trifecta—ordered prediction of first, second and third place; superfecta—ordered prediction of first through fourth place; etc.), or a runner finishing within a specified range of positions (e.g., a "show" wager for a given runner to finish in either first, second or third place; or a quinella wager for predicting the first and second place finishers regardless of order).

For those individuals who have placed a winning wager such that their prediction matches an actual event outcome, their payout is determined, in part, by the difficulty of the wager (e.g., a show wager vs. a trifecta wager), in part, by the size of the pool as defined by the total amount of wagers placed for a given event and, in part, the specific wagers made by other bettors. Thus, for example, if a defined prize pool is to be paid out to those wagers which selected runner X as the winner and, for example, 20 individual wagers were placed on runner X to win, the prize pool will be divided among those 20 bettors in proportion to the amount each of the 20 individual bettors wagered on such an outcome.

Parimutuel wagering is preferred by some individuals because a wager may be "handicapped" in the sense that a bettor may study different facets of an event to make an educated prediction of the outcome of the event prior to placing their wager. For example, in a horse race, a bettor may review the past performances of the horses, the training histories of the horses, the breeding histories of the horses, which jockeys will be participating and other related information. Consideration of such information enables a bettor to make a more educated prediction regarding the outcome of a race or other event.

Many individuals prefer other types of wagering, such as slot machines, purchasing of lottery tickets or other conventional wagering activities offered at a casino or a lottery facility, because they find the act of handicapping a parimutuel wager to be complex, difficult and time consuming. Furthermore, often there is a significant period of time between races at racing facilities. Several minutes may pass between the time an individual places a wager on a race and the outcome of the wager is made known. Such is in contrast to casino wagering wherein multiple wagers may be placed and the outcome of each be made known in rapid succession such as with slot machines.

There have been various attempts by parimutuel venues to attract the individuals that are more inclined to participate in simpler wagering activities. For example, random wagers, sometimes referred to as "quick picks," have been offered at parimutuel venues to satisfy those patrons that prefer simpler wagering activities. Such a random wager may include an appropriately configured wagering terminal which is configured to randomly choose the outcome of the event (e.g., the winning runner of a race) on which the bettor places his or her wager. These wagers are added to the pool of wagers or, in other words, commingled with handicapped wagers that have been placed in regards to the same event. However, those placing random wagers, such as a quick-pick type wager, may feel disadvantaged by the fact that other bettors are handicapping their wagers and, thus, such other bettors may have a better chance at winning a portion of the wagering pool.

Other attempts to attract new patrons, including those who may not be comfortable in handicapped-style wagering, include, for example, those set forth in U.S. Pat. No. 6,309,307 issued to Krause et al. and U.S. Pat. No. 6,152,822 issued to Herbert.

The Krause et al. patent generally describes a method of incorporating casino game attributes with a parimutuel wagering activity. For example, a blackjack-style game may be played wherein a bettor wagers on whether the sum of the numbers assigned to the first four runners to finish a race will be closer to 21, without going over, than will the sum of the numbers assigned to the last four runners to finish the race. It is noted that such a scheme is still amenable to a bettor handicapping his or her wager. However, it is believed that incorporation of familiar casino or sports betting themes will entice new patrons to frequent parimutuel venues.

The Herbert patent generally describes a method of wagering which includes an activity occurring subsequent at least one parimutuel event and which utilizes the outcome of the one or more parimutuel events as a "wagering base" for a slot machine type wagering activity. For example, the win, show, exacta and perfecta results of one or more races are selected to comprise the "wagering" base or, in other words, act as the possible outcomes of a slot machine format wagering activity. The odds which were associated with the selected outcomes of the parimutuel wagers (win, show, etc.) may be programmed into an appropriate wagering device or system such that, for example, if the odds of a selected perfecta wager (from a previously run race) were 24 to 1 (i.e., a probability of 0.04), the same probability will be assigned to the selected perfecta wager as a potential outcome of the slot machine-style wagering activity. Outcomes from multiple parimutuel events or races may be used to build the wagering base and the actual outcome of a "spin" of the slot machine wagering activity is determined by a random number generator based on the probabilities assigned to the various potential outcomes drawn from the wagering base. It is again noted that the slot machine wagering activity is conducted separately from the parimutuel events.

Even with schemes such as described in the above-referenced Krause et al., and Herbert patents, other aspects of parimutuel wagering stand in need of improvement. For example, an important factor in attracting patron interest is the size of the probable jackpot that a patron can expect to win. Thus, it is desirable to provide relatively large jackpots and to provide relative predictability in providing such jackpots. However, in conventional parimutuel wagering activities, the jackpot is inversely related to the ability of the bettor population to predict the outcome of a given event or series of events. Because the predictability of events varies considerably from one event to another, a parimutuel venue has little control over the jackpots offered in association with such events.

In view of the shortcomings in the art, it would be advantageous to provide a method of parimutuel wagering which is attractive to a wide variety of patrons, which provides for increased jackpots and provides greater predictability in providing such jackpots. It would also be advantageous to provide a method of placing a parimutuel wager with a simplified prediction process such that a given bettor did not perceive a distinct disadvantage relative to another bettor who was relatively accomplished at handicapping wagers.

BRIEF SUMMARY OF THE INVENTION

In accordance with one aspect of the invention, a method of conducting a wagering activity is provided. The method includes identifying an event upon which a plurality of bettors may each place at least one wager. Each bettor of the plurality is enabled to provide input regarding at least one portion of their respective at least one wager prior to the event. At least one other portion of each bettor's at least one wager is randomized prior to the event. The event may include, for example, a race wherein the player selected portion of the at least one wager includes a player selection of at least one participant and where the randomized portion of the at least one wager includes a randomized selection of at least one other participant. The player selected and randomized portions may include other selections or identifications as set forth in greater detail hereinbelow.

In accordance with another aspect of the present invention, a method of wagering is provided. The method includes enabling a plurality of bettors to each place at least one wager regarding an event to be conducted in the future, wherein the wager is based on a prediction of an outcome of the event. The plurality of bettors is further enabled to each individually select at least one predicted aspect of the outcome of the event. At least one other predicted aspect of the outcome of the event is randomly selected for each bettor's at least one wager. Subsequent an actual occurrence of the event, the player predicted aspect and the randomly selected aspect are compared to the actual outcome of the event. The event may be conducted by those administering the wager, such as a racing venue, or may be conducted by another party and simply monitored by those administering the wager.

In accordance with yet another embodiment of the present invention, a system is provided for conducting a parimutuel wager. The system includes a computer having at least one processor and at least one memory device. An input device is configured to receive at least one selection from each of a plurality of bettors regarding at least one predicted aspect of an outcome of an event. The computer is configured to randomly select at least another predicted aspect of the outcome of the event and combine the player predicted aspect and the randomly predicted aspect to form a wager regarding an actual outcome of the event.

In accordance with a further aspect of the present invention, a network is provided. The network includes a plurality of wagering systems operably coupled with each other. At least one of the wagering systems includes a computer having at least one processor and at least one memory device. An input device is configured to receive at least one selection from each of a plurality of bettors regarding at least one predicted aspect of an outcome of an event. The computer is configured to randomly select at least one other predicted aspect of the outcome of the event and combine the player predicted aspect and the randomly predicted aspect to form a wager regarding an actual outcome of the event.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

The present invention is directed to a method of wagering, particularly parimutuel type wagering, wherein the pool (the combination of wagers placed for a given wagering activity) consists of partially random wagers where the bettors provide an input regarding, or maintain a specific degree of control over, the wagers. Such partially random wagers may include, for example, wagers comprising a player-selected portion and a portion selected through a random method beyond the control of the bettor. Specific examples of such partially random wagers are set forth in greater detail hereinbelow. Such methods of wagering serve to create substantial jackpots on a more predictable basis while simplifying the wagering process for inclusion of a greater variety of patrons who wish to participate in anticipation of claiming such jackpots.

In an exemplary embodiment of the present invention, a plurality of events, such as dog or horse races (referred to hereinafter as races for purposes of convenience), may be conducted. Such races may occur in relatively rapid succession and may be run at a plurality of tracks or venues wherein races may be monitored from one track to another through an appropriate network or broadcast system as will be appreciated by those of ordinary skill in the art. A wagering activity may include, for example, selecting, through a combination bettor selection and random selection, the winning contestants or runners of the plurality of races.

Figure 1:
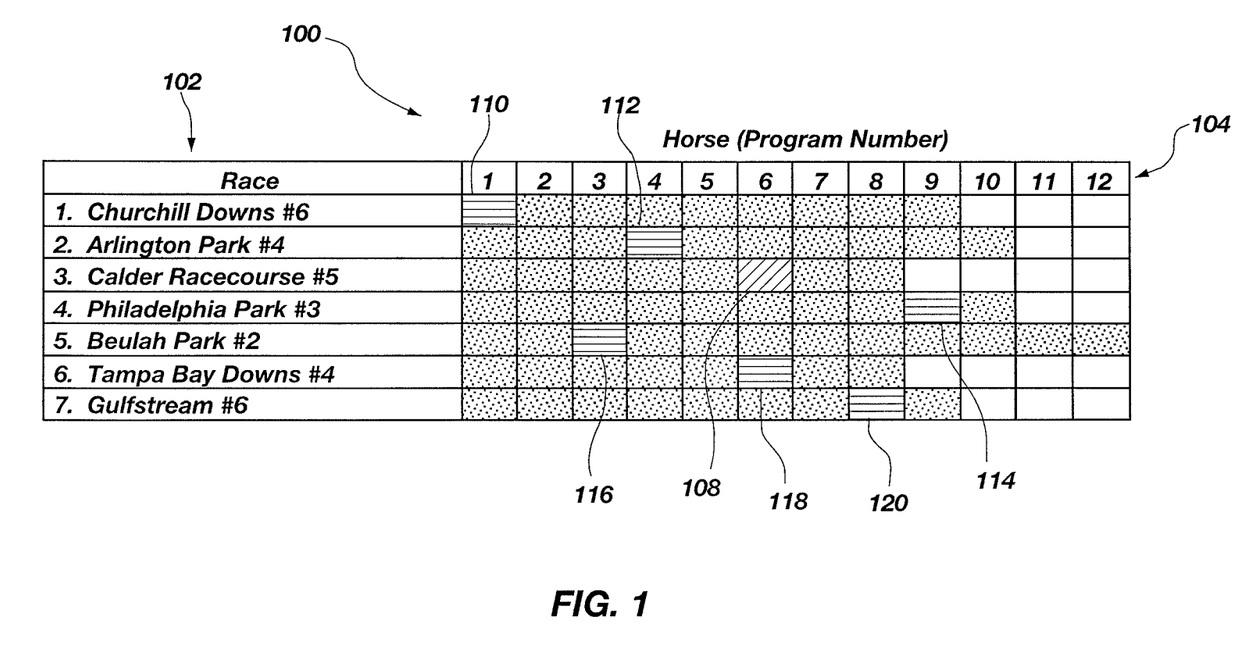
FIG. 1 is a schematic of a sample interface for conducting wagering activity in accordance with one embodiment of the present invention.

For example, the wagering activity may include seven specified races that may have been previously identified by the administrator of the wagering activity. A bettor may pay a specified amount to participate in the wagering activity and then select a runner of one race, in accordance with his or her predictions or handicapping activities, while the runner is randomly selected from each of the remaining six races. An exemplary interface 100 for such a wager is shown in FIG. 1. The exemplary interface 100 lists the seven races 102 that comprise the wagering activity, as well as an associated list of runner numbers 104 for each race, as generally indicated by darkened cells or runner locations. The exemplary interface 100 further shows that, of the seven specified races 102, the bettor selected runner number 6 to win the third race (Calder Racecourse #5) as indicated by the diagonally hatched runner location 108.

With regard to the remaining races, runners are selected at random, such as through the use of a computer with a random number generator, to complete the bettor's wager. The randomly selected runners are indicated by horizontal hatching on the exemplary interface 100. Thus, runner number 1 of the first race (Churchill Downs #6), runner number 4 of the second race (Arlington Park #4), runner number 9 of the fourth race (Philadelphia Park #3), runner number 3 of the fifth race (Beulah Park #2), runner number 6 of the sixth race (Tampa Bay Downs #4) and runner number 8 of the seventh race (Gulfstream #6) as indicated by runner locations 110, 112, 114, 116, 118 and 120 respectively, were all selected by random means without bettor control or input. The complete wager comprises both the bettor selected portion (i.e., runner 6 in the third race) and the randomly selected portion.

Figure 2:
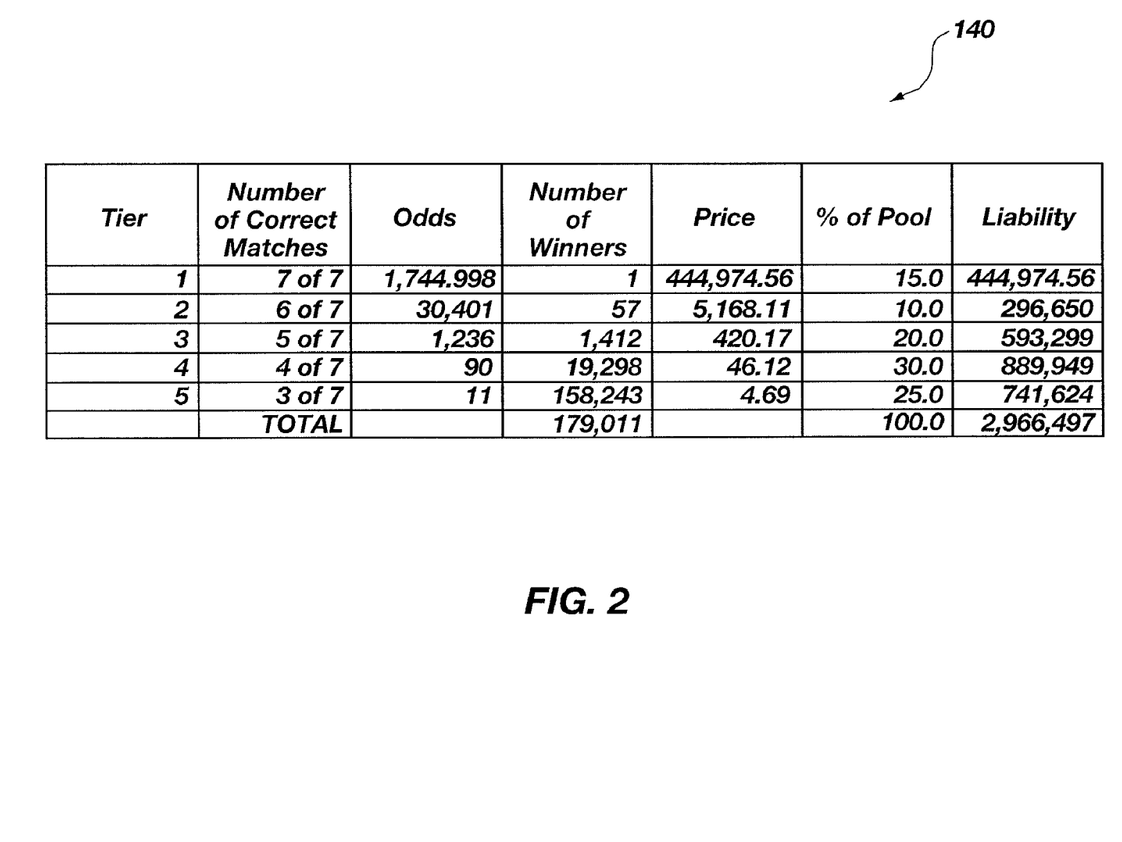
FIG. 2 is a table showing an exemplary tiered prize structure in accordance with an embodiment of the present invention.

Referring now to FIG. 2, a tiered prize structure 140 is shown which may be used in conjunction with the wagering methods described with respect to FIG. 1. The exemplary tiered prize structure 140 is based on the exemplary assumptions of an average field size (e.g., the average number of runners or participants in the selected events) being 8.2, a selection bias of 30% (meaning that player selected portions of a wager are correct 30% of the time), a ticket price (or required wager amount) of $2.00 with 1,744,998 individual wagers being made, a take-out of 15% of the collected wagers being allocated to the administrator of the wagering activity and a jackpot allocation of 15% of the collected wagers. Additionally, the tiered prize structure 140 is based on the assumption that a criterion for the winning event is the selection of a winning participant for a given race (rather than, for example, a show or place wager).

Based on these assumptions, and considering an exemplary wagering activity comprising seven races wherein the bettor is allowed to make a single selection, a wager that results in seven correct selections out of a possible seven races (only one such wager is expected in the present scenario) would be paid a first tier jackpot of $444,974.56. The wager which results in six correct selections out of a possible seven, (57 of such wagers would be expected in the presently considered scenario) would each be paid $5,168.11. The exemplary prize structure 140 continues with prizes or jackpots being awarded to bettors whose wagers result in as few as three correct selections out of a possible seven (158,243 of such wagers would be expected in the presently considered scenario) wherein each such wager would be paid $4.69. In situations where the jackpot is not won because, for example, the betting pool is too small for the price model, the jackpot may be carried over into, for example, another multi-race wagering activity.

Of course, the exemplary embodiments described with respect to FIGS. 1 and 2 need not follow either the exemplary assumptions set forth herein or the exemplary tiered prize structure 140. Rather, variables, such as the take-out, jackpot allocation, number of total events (e.g., races), number of player selections allowed, average field size, win criteria (e.g., win, place, show), number of tiers and other variables may be altered and different prize structures may be utilized. Using such variables, one of ordinary skill in the art may compute the various odds of winning a specified wagering event and provide a corresponding prize structure. It is further noted that the above exemplary embodiments readily provide scalability. Thus, the present method may be tailored to individual venues depending, for example, on the number of patrons attending a given event and the expected level of participation by the patrons in the wagering activity.

In providing a wager that includes a partially random selection, numerous advantages are provided to the administrator of the wagering activities. First of all, large jackpots may be created to encourage participation by a substantial number of patrons. Additionally, partial random selection provides increased jackpot predictability. Instead of allowing wagers wherein an unknown number of the wagers are handicapped (thereby resulting in unpredictable jackpots from one race to another), the administrator will have a considerable amount of control over the jackpots being offered. Furthermore, such a method enables the administrator to offer of a greater number of tiered jackpots for added enticement of wagering by the patrons. Moreover, the present invention provides simplification with regard to handicapping the selection of runners. For example, if a bettor does not have adequate resources (time, access to past performances, etc.) to handicap all of the races of a given wagering activity, he or she can focus on a single race or on a subset of runners to determine the bettor selected portion of the wager. This allows the bettor to participate without being at a disadvantage relative to those who have access to the resources necessary for handicapping all of the races.

Another exemplary embodiment of the present invention may include a wagering activity structure such that the entire betting pool comprises wagers wherein the bettor selects one or more runners and wherein one or more runners are randomly selected for a single race. For example, a bettor may place a conventional "win" wager selecting runner number 5 of a given race. The bettor may also place a separate wager for a separate pool wherein the bettor selects runner number 5 as the winning participant, and wherein a plurality of other runners (e.g., three) are randomly chosen to finish, for example, in the second, third and fourth positions. The additional wager thus comprises the player-selected runner to win, combined with the randomly selected runners, to form a "superfecta" type wager. If the bettor's wager matches all, or a portion, of the actual order of finish, the bettor may be paid a prorated prize that is determined by the portion of the prize pool apportioned to a specified tier and the number of winning wagers which are classified with that specified tier. Such a method enables patrons to compete for a larger jackpot pool than may be available in a conventional superfecta wager. Such a method also enables the implantation of partially random wagering without the need to conduct multiple races or events such that the wagering activity is readily carried out at a single venue in a relatively short period of time.

In accordance with yet another exemplary embodiment of the present invention, a method of conducting a wagering activity may enable a bettor to completely select the runners of a given race, while randomizing the selected or predicted outcome based on the selected runners. For example, after placing a conventional "win" wager, a bettor may elect to enhance their wager by adding further monetary value to the wager and then selecting a plurality of numbers for the enhanced portion of the wager. After completion of the race, a random selection of numbers occurs. The random selection of numbers may be lottery style, wherein individual Ping-Pong balls, each carrying indicia of a number, are randomly ejected from an apparatus containing a pool of such Ping-Pong balls. In another embodiment, the names of jockeys may be randomly selected wherein each jockey name is associated with a different number, such as the program number assigned to the horse ridden by the jockey in the most recent race. Of course other methods of randomly selecting numbers, and indicia other than numbers, may be used as will be appreciated by those of ordinary skill in the art.

In a further embodiment of the present invention, a wagering activity may be conducted wherein the bettor controls the selection of runners while the finishing order of the selected runners is randomly assigned. Thus, for example, a bettor may select runners 2, 5, 6 and 7 for a superfecta type wager. The selection of those runners is then at least partially randomly ordered. In an embodiment where the ordering is partially random, the bettor may be allowed, for example, to select the winner, and the second through fourth place finishers will then be randomly ordered. In an embodiment where the ordering is completely random, the bettor has no control or input with regard to which runner will finish in which position. Thus, using the example set forth above wherein runners 2, 5, 6 and 7 are selected by the bettor, a superfecta wager my be placed wherein the bettor may specify runner 6 to be the winner, and wherein the remaining selected runners (i.e., 2, 5 and 7) are randomly ordered as finishing in second, third or fourth place. In the example of forming a superfecta wager with completely random ordering, twenty-four different random combinations may be assigned for each unique selected group of four runners by a bettor. It is noted that other types of wagers (e.g., perfecta, superfecta, quinella, etc.) may similarly be implemented with such a method.

In yet a further embodiment of the present invention, a wagering activity may be conducted wherein the selection of runners is at least partially random, but wherein the ordering of the selected runners is determined by the bettor. For example, upon placing of a trifecta wager, the runners 2, 3 and 8 may be randomly selected, such as by a computer using a random number generator. The bettor may then order the randomly (or partially randomly) selected runners according to his or her prediction of how the selected runners will finish the race. Thus, the bettor may, for example, select runner 8 to finish first, runner 2 to finish second, and runner 3 to finish third. In another embodiment the bettor may be allowed to have partial input regarding the selection of runners. It is noted that other types of wagers (e.g. perfecta, superfecta, quinella, etc.) may be also be implemented with such a method as may be desired.

In accordance with yet another embodiment of the present invention, a wagering activity may be conducted wherein both the selection of runners and the ordering thereof are partially random. Thus, a player may select at least one runner and at least one other runner may then be randomly selected. After selection of all the runners, at least one of the selected runners is placed in a finishing order by the bettor and at least one other runner is randomly placed in a finishing order. In one embodiment, the bettor may be allowed to make his or her selections and/or ordering determinations prior to the random selections and assignments. In another embodiment the random selections and/or assignments may be made prior to any bettor input.

Figure 3:
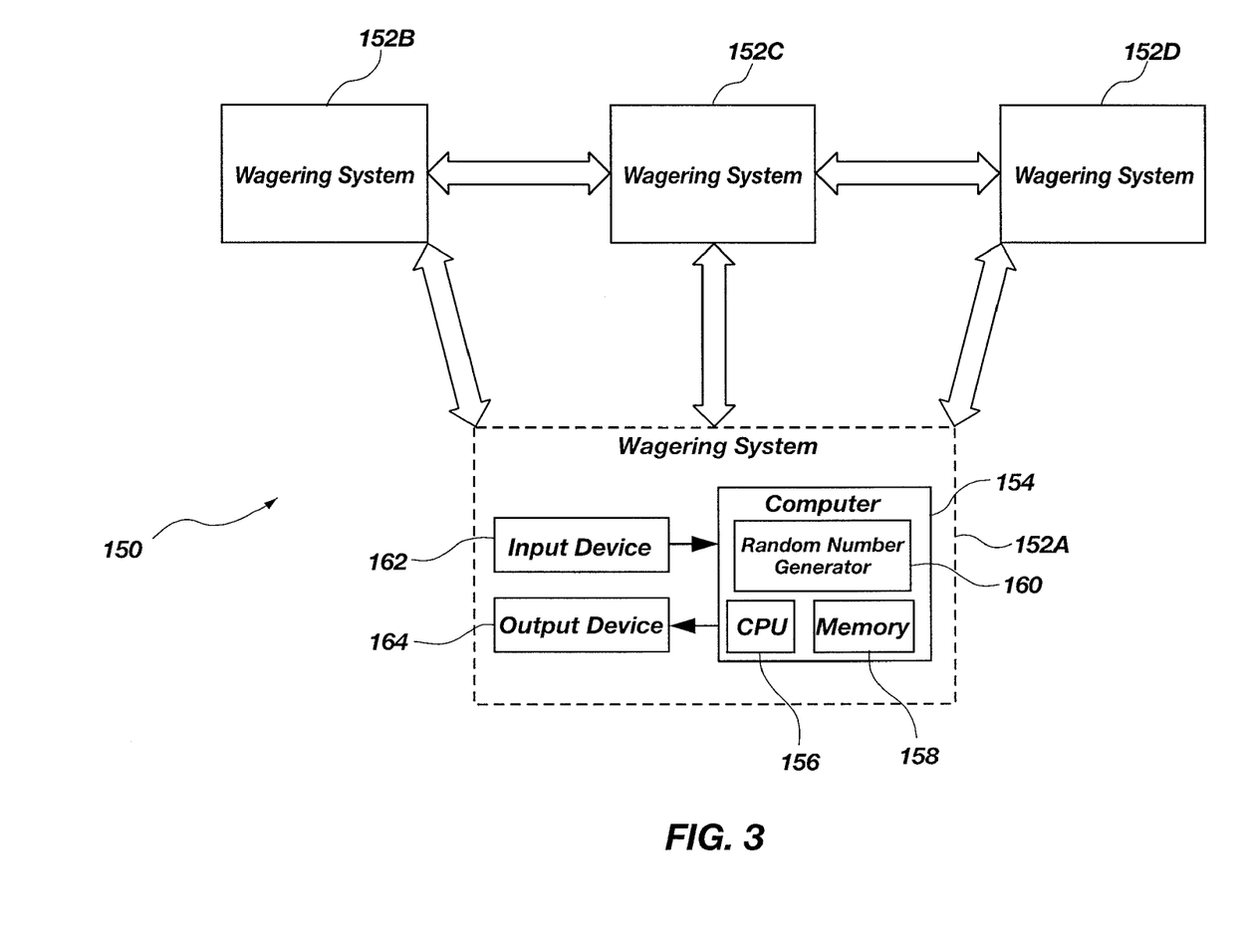
FIG. 3 is a schematic of a wagering system and network, which may be used in accordance with an aspect of the present invention.

Referring now to FIG. 3, a network 150 for conducting parimutuel wagers may include a plurality of systems 152A-152D that are operably coupled to one another. Each system may include, for example, a computer 154 with a central processing unit (CPU) 156 or other processing device and associated memory 158. Each computer 154 may be configured to act as a random number generator 160 for random selection of one or more predicted aspects of an outcome of an event. An input device 162 may be coupled with the computer 154 for bettor input regarding another predicted aspect of an outcome of an event. The input device 162 may further include a device for accepting a monetary value associated with a wager wherein the device may include, for example, a coin collector, a bill collector or a card reader. An output device 164 may also be coupled with the computer and configured, for example, to display the resulting combination of the bettor-selected prediction and randomly selected prediction that forms a wager. Such an output device 164 may include, for example, a visual display and or a printing device. Additionally, such an output device 164 may be configured to display the results of an event taking place at a remote venue. Thus, for example, a first system 152A may be located at a first venue while another system 152D may be located at a second remotely located venue. Thus, the network formed of the plurality of systems 152A-152D may enable wagering on, and monitoring of, events at multiple venues substantially simultaneously if so desired. In another embodiment, the systems 152A-152D may be located at a single venue where, for example, a first system 152A acts as a server while other systems 152B-152D act as terminals coupled with the server.

In sum, the present invention contemplates methods and systems of conducting wagers, such as parimutuel wagers. In one exemplary embodiment an event, such as a horse race, dog race, etc., is identified for which a plurality of bettors may each place at least one wager. Each bettor of the plurality is enabled to provide input regarding at least one portion of their respective at least one wager prior to the event. At least one other portion of each bettor's at least one wager is randomized prior to the event. The wager then comprises the combination of the bettor-selected portion and randomized portion. Stated another way, the bettors are enabled to each individually select at least one predicted aspect of an outcome of the event while at least one other predicted aspect of the outcome of the event is randomly selected. Again, the resultant wager is the combination of the bettor selected aspect, or aspects, and the randomly selected aspect, or aspects, of the event's outcome.

It is noted that numerous techniques may be employed in practicing the present invention. For example, while the above exemplary embodiments have been discussed in terms of races with runners or participants, the present invention may incorporate wagering activities on other events. Also, while randomization has been discussed herein in terms of an exemplary random number generator, other techniques may be used including, for example, the use of lottery style Ping-Pong ball systems. Moreover, while the exemplary embodiments have been discussed in terms of predicting the winner or the finishing order of a race or other event, the predicted aspects (either player selected or randomly selected) may include, for example, interim times, finish times or interim ranks of the various participants of an event. Thus, the present invention is flexible in terms of its application to events and predicted aspects of such events.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A method of conducting a wagering activity, the method comprising:
   providing an event upon which a plurality of bettors each place at least one wager within a wager pool over a gaming system, the event comprising one or more races;
   requiring each bettor of the plurality to provide input regarding at least one portion of a bettor's respective at least one wager for each of the one or more races prior to the one or more races with an input device coupled to the gaming system;
   randomizing at least one other portion of each bettor's respective at least one wager with respect to at least one race of the one or more races prior to the one or more races using a random number generator; and
   maintaining the wager pool to consist of the wagers each having at least one randomized portion.

2. The method according to claim 1, wherein requiring each bettor of the plurality to provide input regarding at least one portion of the bettor's respective at least one wager for each of the one or more races further includes requiring the each bettor to select at least one participant of the one or more races.

3. The method according to claim 2, wherein randomizing at least one other portion of each bettor's respective at least one wager further includes randomly assigning a predicted performance indicator to the at least one selected participant using the random number generator.

4. The method according to claim 3, wherein providing the event upon which a plurality of bettors may each place at least one wager further includes conducting one or more races having a plurality of participants therein.

5. The method according to claim 4, wherein randomly assigning the predicted performance indicator includes randomly assigning an order in which the at least one selected participant will finish the at least one race using the random number generator.

6. The method according to claim 5, wherein requiring each bettor to select at least one participant of the event includes enabling each bettor to select another plurality of participants.

7. The method according to claim 6, wherein providing the event upon which a plurality of bettors each place at least one wager includes enabling the plurality of bettors to place at least one of a perfecta, trifecta, superfecta or quinella wager.

8. The method according to claim 1, wherein providing the event upon which a plurality of bettors each place at least one wager includes conducting a plurality of races wherein each race includes a plurality of participants.

9. The method according to claim 8, wherein requiring each bettor of the plurality to provide input regarding at least one portion of their respective at least one wager further includes selecting at least one participant for each of the one or more races.

10. The method according to claim 9, wherein randomizing at least one other portion of each bettor's respective at least one wager further includes randomly assigning an order in which the at least one selected participant will finish its associated at least one race of the one or more races using the random number generator.

11. The method according to claim 9, wherein selecting at least one participant for each of the one or more races further includes selecting a finishing order of the at least one participant of at least one race of the one or more races.

12. The method according to claim 9, wherein randomizing at least one other portion of each bettor's respective at least one wager further includes randomly selecting at least one other participant of the at least one race of the one or more races.

13. The method according to claim 1, further comprising compiling the wager pool from the at least one wager of each of the plurality of bettors, removing a defined percentage of the wager pool and providing at least one jackpot from a remaining wager pool.

14. The method according to claim 13, wherein providing at least one jackpot further includes providing a tiered prize structure including at least a first prize of a first value and plurality of second prizes each of a second value different from the first value.

15. The method according to claim 14, wherein requiring each bettor of the plurality to provide input regarding at least one portion of the bettor's respective at least one wager further includes requiring each bettor to select at least one participant of the at least one race of the one or more races and wherein randomizing at least one other portion of each bettor's at least one wager further includes randomly selecting at least one other participant of the at least one race of the one or more races.

16. The method according to claim 14, wherein the at least one race of the one or more races includes a plurality of participants, wherein requiring each bettor of the plurality to provide input regarding at least one portion of the bettor's respective at least one wager further includes enabling each bettor of the plurality to assign a performance indicator to at least one of the plurality of participants and wherein randomizing at least one other portion of each bettor's respective at least one wager further includes randomly assigning another performance indicator to at least one other participant of the plurality.

17. The method according to claim 16, wherein an associated performance indicator of the at least one participant and the at least one other participant include assigning a respective predicted finishing order to each of the at least one participant and the at least one other participant.

18. A method of wagering, the method comprising:
enabling a plurality of bettors to each place at least one wager within a wager pool over a gaming system regarding an event comprising one or more races to be conducted in the future, wherein each bettor's at least one wager is based on a prediction of an outcome of the event;
requiring the plurality of bettors to each individually select at least one predicted aspect of the outcome of each of the one or more races using an input device coupled to the gaming system;
randomly selecting at least one other predicted aspect of the outcome of at least one race of the one or more races using a random number generator for each of the bettors' respective at least one wager; subsequent an actual occurrence of the event, comparing the at least one predicted aspect and the at least one other predicted aspect to an actual outcome of the event; and
maintaining the wager pool to consist of the wagers each having at least one randomized portion.

19. The method according to claim 18, wherein each race of the plurality of races comprises a plurality of participants.

20. The method according to claim 19, wherein requiring the plurality of bettors to each individually select at least one predicted aspect of the outcome of the event further includes requiring the plurality of bettors to each individually select a predicted aspect of a performance of at least one participant of the plurality.

21. The method according to claim 19, wherein randomly selecting at least one other predicted aspect of the outcome of at least one race of the one or more races using a random number generator for each of the bettors' at least one wager further includes using the random number generator to randomly select a predicted aspect of a performance of at least one other participant of the plurality for at least one race of the one or more races.

22. The method according to claim 19, wherein randomly selecting at least one other predicted aspect of the outcome of the at least one race of the one or more races using a random number generator for each of the bettors' at least one wager further includes using the random number generator to randomly select a predicted aspect of a performance of the at least one participant of the plurality for at least one race of the one or more races.

23. The method according to claim 18, further comprising conducting the event including conducting one or more races wherein each race includes a plurality of participants.

24. The method according to claim 23, wherein requiring the plurality of bettors to each individually select at least one predicted aspect of the outcome of each of the one or more races further includes requiring the plurality of bettors to each individually select a predicted aspect of a performance of at least one participant in each of the one or more races.

25. The method according to claim 23, wherein randomly selecting at least one other predicted aspect of the outcome of at least one race of the one or more races using a random number generator for each of the bettors' at least one wager further includes using the random number generator to randomly select a predicted aspect of a performance of at least one participant of the at least one race of the one or more races.

26. The method according to claim 23, wherein randomly selecting at least one other predicted aspect of the outcome of the at least one race of the one or more races using the random number generator for each of the bettors' at least one wager further includes randomly selecting a predicted aspect of a performance of at least one other participant of the at least one race of the one or more races.

27. The method according to claim 24, wherein randomly selecting at least one other predicted aspect of the outcome of the at least one race of the one or more races using the random number generator for each of the bettors' at least one wager further includes using a random number generator to randomly select another predicted aspect of the performance of the at least one participant of the at least one race of the one or more races.

28. The method according to claim 23, wherein conducting one or more races includes conducting at least one race at a first location and at least one race at a second location.

29. The method according to claim 23, further comprising compiling the wager pool comprising any wager placed by the plurality of bettors on the event, reducing the wager pool by a determined portion, and dividing a remainder of the wager pool among another plurality of bettors responsive to comparing the at least one predicted aspect and the at least one other predicted aspect to an actual outcome of the event.

30. The method according to claim 29, wherein dividing the remainder of the wager pool among the another plurality of bettors further includes providing a tiered payout structure, and wherein providing the tiered payout structure includes considering a quantity of races included in the plurality of races and an average number of participants for the plurality of races.

31. The method according to claim 30, wherein providing the tiered payout structure further includes considering a predicted selection bias of the plurality of bettors and wherein a plurality of predicted aspects of the outcome of the event is selected by each bettor of the plurality.

32. A system for conducting a parimutuel wager comprising:
a computer having at least one processor and at least one memory device;
an input device configured to receive at least one selection from each of a plurality of bettors regarding at least one predicted aspect of an outcome of each race of one or more races; and
wherein the computer is configured to randomly select at least one other predicted aspect of the outcome of at least one race of the one or more races and combine the at least one predicted aspect and the at least one other predicted aspect to form a wager regarding an actual outcome of the event;
wherein the at least one selection from each of the plurality of bettors forms a wager pool consisting of wagers each having at least one predicted aspect of the outcome of the at least one race of the one or more races randomly selected by the computer.

33. The system of claim 32, further comprising an apparatus for receiving a monetary value associated with the wager.

34. The system of claim 32, further comprising an output device configured to display the at least one predicted aspect and the at least one other predicted aspect.

35. A network comprising:
a plurality of wagering systems operably coupled with each other, wherein at least one wagering system of the plurality comprises:
a computer having at least one processor and at least one memory device; and
an input device configured to receive at least one selection from each of a plurality of bettors regarding at least one predicted aspect of an outcome of each race of one or more races;
wherein the computer is configured to randomly select at least one other predicted aspect of the outcome of at least one race of the one or more races and combine the at least one predicted aspect and the at least one other predicted aspect to form a wager regarding an actual outcome of the at least one race of the one or more races;
wherein the at least one selection from each of the plurality of bettors forms a wager pool consisting of wagers each having at least one predicted aspect of the outcome of the at least one race of the one or more races randomly selected by the computer.

36. The network of claim 35, wherein the at least one wagering system further comprises an apparatus for receiving a monetary value associated with the wager.

37. The network of claim 35, wherein the at least one wagering system further comprises an output device configured to display the at least one predicted aspect and the at least one other predicted aspect.

38. The network of claim 35, wherein the at least one wagering system is located at a first wagering venue and wherein at least a second wagering system is located at a second wagering venue remotely located from the first wagering venue.

* * * * *

UNITED STATES PATENT AND TRADEMARK OFFICE
CERTIFICATE OF CORRECTION

| | |
|---|---|
| PATENT NO. | : 7,883,411 B2 |
| APPLICATION NO. | : 10/704533 |
| DATED | : February 8, 2011 |
| INVENTOR(S) | : Kenneth A. Vlazny et al. |

It is certified that error appears in the above-identified patent and that said Letters Patent is hereby corrected as shown below:

In the drawings:

In FIG. 2, In column 3, row 2 change "1,744.998" to --1,744,998--

Replace FIG. 2 with the following amended figure:

FIG. 2

In the specification:

| | | |
|---|---|---|
| COLUMN 4, | LINES 44,45 | change "combination bettor" to --combination of bettor-- |
| COLUMN 6, | LINE 4, | change "offer of a" to --offer a-- |
| COLUMN 7, | LINE 59, | change "computer" to --computer 154-- |

In the claims:

| | | | |
|---|---|---|---|
| CLAIM 1, | COLUMN 8, | LINE 52, | change "bettors each" to --bettors may each-- |
| CLAIM 1, | COLUMN 8, | LINE 61, | change "to at least" to --to the at least-- |
| CLAIM 1, | COLUMN 8, | LINE 64, | change "of the wagers'" to --of wagers-- |
| CLAIM 2, | COLUMN 9, | LINE 2, | change "requiring the" to --requiring-- |
| CLAIM 11, | COLUMN 9, | LINE 45, | change "of at least" to --of the at least-- |
| CLAIM 14, | COLUMN 9, | LINE 60, | change "plurality" to --a plurality-- |

Signed and Sealed this
Twenty-first Day of May, 2013

Teresa Stanek Rea
*Acting Director of the United States Patent and Trademark Office*